United States Patent [19]

Cavicchiolo

[11] Patent Number: 5,482,725

[45] Date of Patent: Jan. 9, 1996

[54] ALIMENTARY PASTE FOOD PRODUCT AND METHODS OF MANUFACTURE

[76] Inventor: Romano Cavicchiolo, 45 Chemin Planta, CH 1223 Cologny, Switzerland

[21] Appl. No.: 193,041

[22] PCT Filed: Jun. 7, 1993

[86] PCT No.: PCT/CH93/00143

§ 371 Date: Feb. 4, 1994

§ 102(e) Date: Feb. 4, 1994

[87] PCT Pub. No.: WO93/25089

PCT Pub. Date: Dec. 23, 1993

[30] Foreign Application Priority Data

Jun. 11, 1992 [CH] Switzerland ............................. 1844/92

[51] Int. Cl.$^6$ ................................ A21C 11/00; A23L 1/16
[52] U.S. Cl. ..................... 426/143; 426/557; 426/412; 426/413
[58] Field of Search ................................... 426/557, 143, 426/412, 413

[56] References Cited

U.S. PATENT DOCUMENTS

| | | | |
|---|---|---|---|
| 740,858 | 10/1903 | Hosmer | 426/143 |
| 1,556,617 | 10/1925 | Laskey | 426/143 |
| 4,732,770 | 3/1988 | Welygan et al. | 426/557 |

FOREIGN PATENT DOCUMENTS

| | | | |
|---|---|---|---|
| 1004293 | 3/1952 | France. | |
| 3345967 | 6/1985 | Germany. | |
| 61-047161 | 3/1986 | Japan. | |
| 1-265864 | 10/1989 | Japan. | |

OTHER PUBLICATIONS

"Processing pasta foods, e.g. spaghetti—by inserting dry pasta in tin with hydrating liq. e.g. sauce, sealing, and retorting", Jan. 29, 1981, 81–47818, Derwent abstract.

Ethyl Corporation Vis Queen Film Products brochure, Aug. 10, 1993, Richmond, Va.

*Primary Examiner*—Donald E. Czaja
*Assistant Examiner*—Choon P. Koh
*Attorney, Agent, or Firm*—Young & Thompson

[57] ABSTRACT

The food product comprises an arrangement of parallel elongate lengths of a hollow alimentary paste product (1b) connected together. The ends (5) of the lengths constitute a first surface on one side of the arrangement and can be closed. The arrangement can be enclosed in a plastic wrapping (3) capable of withstanding cooking and provided with openings (4). In one method of manufacture, the lengths are arranged in the desired form, the flat surface is wetted and slight pressure is exerted on the sides of the assembled lengths. In another method of manufacture, an arrangement of lengths of the product (1b) is placed in a plastic wrapping (3). The food product thus formed is firm and is easily transportable after cooking. It can be eaten without implements and without mess, by holding it in the hand like a sandwich or hamburger, even if it contains sauce. It can also be used as a new form of pasta.

10 Claims, 2 Drawing Sheets

ALIMENTARY PASTE FOOD PRODUCT AND METHODS OF MANUFACTURE

FIELD OF THE INVENTION

The present invention is concerned with an alimentary paste food product, as well as with methods of manufacture of the same.

BACKGROUND OF THE INVENTION

Hamburgers and sandwiches are well-known in the field of fast foods. These products can be conveniently eaten without needing neither a plate, nor any implement, since they are held directly in the hand either wrapped or not in a napkin. They can thus be eaten without difficulty even while walking.

On the other hand, alimentary paste products such as for example spaghetti and macaroni are quite popular. To eat such alimentary paste products, it is necessary to serve them in a hollow dish and to have at least a fork. Further, the presence of the sauce makes it very difficult to eat these alimentary paste products without damaging clothes by soiling them.

OBJECTS OF THE INVENTION

Accordingly, the object of this invention is to provide alimentary paste products in a new form, which after cooking can be eaten without any implement, i.e. by holding them directly in the hand, like a sandwich or a hamburger.

An object of the invention is an alimentary paste food product, characterized in that it includes a plurality of elongate hollow parallel lengths made of alimentary paste and connected together, one end of the lengths forming a first surface, which is preferably substantially planar, on one side of the food product.

Another object of the invention are methods of manufacture of this alimentary paste food product.

SUMMARY OF THE INVENTION

According to tile invention, the alimentary paste food product is formed of a parallel arrangement of elongate lengths of hollow alimentary paste connected together. One of the ends of these lengths forms a first surface, which is preferably substantially planar, on one side of the food product. In a first embodiment of the invention, said surface of the food product is closed by a plate of alimentary paste of the same shape and of the same size as the arrangement.

In a second embodiment of the invention, the ends of lengths of the alimentary paste products forming the first surface, are closed on one side.

In another version of this embodiment, the arrangement of the alimentary paste lengths is surrounded at least partly by a plastic wrapping which can withstand cooking in water and which has openings.

In another version of these embodiments, the open ends of the lengths of the alimentary paste products form a second surface, preferably planar and parallel to the first one.

The alimentary paste food product according to the invention can be shaped into a square, a rectangular, a triangular, a polygonal or a circular configuration.

The food product can be formed in a hexagonal configuration. In this case, it includes at least 17 lengths of alimentary paste, with each side of the hexagon being comprised of 3 lengths of alimentary paste. In another version, the hexagonal food product includes 37 lengths of alimentary paste, each side of the hexagon being comprised in this case of 4 lengths of alimentary paste. In another version, it includes 61 lengths of alimentary paste, each side of the hexagon being comprised in this case of 5 lengths of alimentary paste. It can also include 91 lengths of alimentary paste, each side of the hexagon being then comprised of 6 lengths of alimentary paste.

These lengths can consist of small cylindrical macaronis having a circular, oval or polygonal cross-section, and having a length which ranges preferably from 1 to 4 cm.

BRIEF DESCRIPTION OF THE INVENTION

The appended drawings illustrate by way of example two embodiments of the invention.

DETAILED DESCRIPTION OF THE INVENTION

Figure 1:
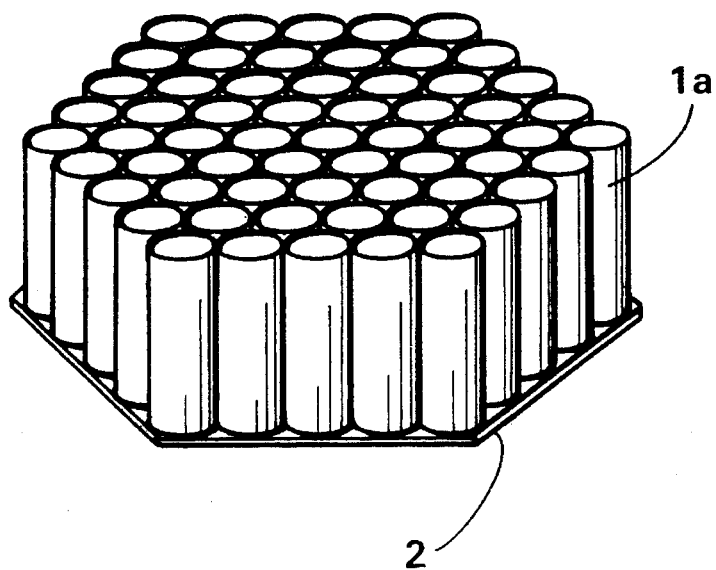
FIG. 1 is a perspective view of the food product according to the first embodiment.

FIG. 1 shows a hexagonal arrangement of 61 small macaronis 1a placed parallel to one another and having all a height of 3 cm. The ends of the macaronis form two surfaces which are substantially planar and parallel. One of the two surfaces of the food product is closed by a thin hexagonal plate 2 made of alimentary paste of the same dimension.

Figure 2:
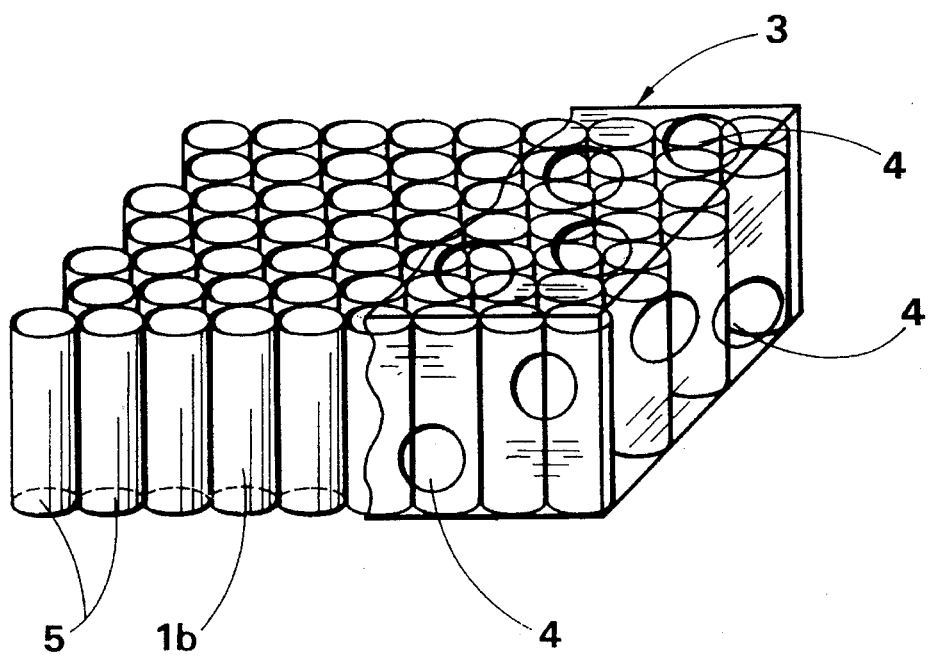
FIG. 2 is a perspective view at 45° of the food product according to the second embodiment.

FIG. 2 shows a rectangular arrangement of macaronis 1b, placed parallel to one another in a plastic wrapping 3. This wrapping 3 has openings 4. The ends 5 of the macaronis form the first surface, which is substantially planar, are closed. The open end of the macaronis forms a second surface, preferably planar and parallel to the first one.

Figure 3:
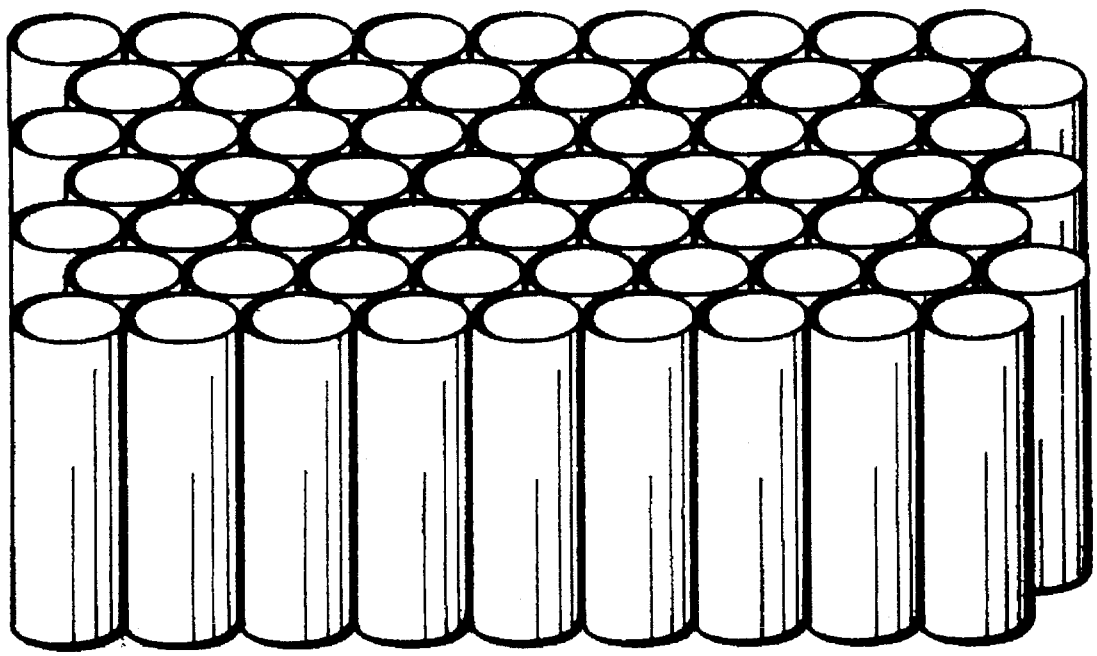
FIG. 3 is a perspective view of the food product according to the second embodiment.

FIG. 3 shows the same arrangement as that shown in FIG. 2, but unwrapped. One can see in this perspective view, that each macaroni located inside the structure is in contact with 6 other macaronis.

A method for the preparation of the alimentary paste food product according to the invention consists in assembling in a parallel manner and in a selected configuration, the selected number of lengths of macaronis, in slightly wetting at least one of the ends of the lengths and then in exerting a slight and equal pressure on all the sides of the selected configuration. Actually, when one wets one end of the lengths of the alimentary paste food products, this moisture rises by capillarity along the generating lines of contact between adjoining lengths. After drying, the food product is monolithic, with the lengths adhering together. An alimentary paste food product is then obtained which holds together because of the slight wetting of the planar surface. The wetting can be carried out by spraying water.

In the case of the end of the lengths of macaronis forming the first planar surface not being closed, one can close the planar surface of the food product obtained by applying the planar surface to be closed against a plate of freshly made alimentary paste, slightly wetted, pressing the food product against said plate, cutting the plate of fresh alimentary paste to the same size and dimensions as the food product and drying the assembly or cooking the same immediately. If the macaronis are already dry and are subjected to a second drying, this has no incidence on the quality of the product.

The food product obtained after drying holds well together and is readily transportable. Should the ends of the lengths form two parallel surfaces, the storing of the food products is most convenient since they can be placed against one another and one on top of the other without any risks of breakage.

The manufacture of the food product surrounded by a plastic wrapping can consist in arranging parallel to one another lengths of alimentary paste which are either dried free or bound together by wetting them slightly, placing them into a wrapping of a selected shape made of a plastic material which can withstand cooking and in closing the wrapping.

This wrapping should have a sufficient number of openings, so that during the cooking in boiling water, the latter may ingress readily. This wrapping must be accurately dimensioned relative to the alimentary paste food product, so that the openings allow the ingress of a maximum amount of water and that the alimentary paste may swell during cooking, but without being large to the extent of allowing a macaroni to fall out from the arrangement at the begining or in the course of cooking and render its structure unstable.

The dry alimentary paste food product is used for the preparation of an alimentary paste food product which can be eaten directly.

The preparation of a product which can be eaten from the paste food product according to the invention is the same as for any other form of pasta. To obtain a product of the desirable crispness, the cooking must however be extended in principle by comparison with that of alimentary pastes when they are not assembled.

The food product can also be precooked and reheated briefly at the last moment.

In the case of the first planar surface of the food product being closed, whether by a plate of alimentary paste or because the end of the lengths of alimentary paste are closed, a process for the preparation of this food product which is particularly advantageous, consists in cooking the dry alimentary paste food product in a boiling cooking liquid, removing it from the cooking liquid, draining it, laying it flat and then in introducing sauce at least into some of the hollow lengths of alimentary paste. The introduction of the sauce can be performed either by pouring the sauce on the surface of the non closed food product, either by means of a machine having at the most a number of outlets for the sauce equal to that of the lengths of the alimentary paste. This process makes it possible to obtain an alimentary paste food product which can be eaten directly, with an implement or without.

In the case of the food product being enclosed in a wrapping, the cooking is carried out as previously by direct immersion of the wrapped food product into boiling water and removing partly or totally the wrapping before introducing the sauce.

These methods of preparation are particularly well suited for the fast food market.

The cooking of the macaronis located at the center of the food product is facilitated by the fact that the contact surface between each length is extremely small and allows the penetration of water inside the structure of the food product. In the case of a dry alimentary paste, the duration of the cooking, which is usually of 10 to 15 minutes, must however be extended to at least 20 minutes to obtain products of the required crispness.

The horizontal structure of this food product is possible for the following reasons. Firstly, the macaronis located in the middle of the food product are circular in shape when dry, but become practically hexagonal after cooking, which accordingly confers a good stability to the structure. The stability of the food product is also dependent upon the height of the alimentary paste product. However, the height of the alimentary pastes after cooking should be such that the food product can easily be eaten. The plate of alimentary paste closing the planar surface of the food product makes it possible to further increase the stability of the assembly. When the food product is eaten, the macaronis are easily detached. This food product is in particular designed to be eaten like a hamburger or a sandwich.

The food product according to the invention can also be used as a new form of pasta which after cooking can be easily taken out from the cooking liquid and easily drained.

The invention has now made it possible to prepare an alimentary paste food product which after cooking can be eaten without any implement, i.e. which can be held in the hand as a sandwich or a hamburger. The alimentary paste products can easily be removed one by one from the food product and the presence of sauce causes no problem, even when the food product is eaten while walking. These alimentary pastes are particularly well suited for the fast food market.

We have described above how an alimentary paste food product can be obtained by assembling lengths of hollow alimentary paste laid side by side and bound together by wetting.

One can obviously obtain the alimentary paste food product described in any other manner, for example by extruding simultaneously hollow tubes of alimentary paste through a single die, holding the extruded tubes together during their wetting and their bonding, and finally cutting them to obtain food products of the desired height. These food products can then be placed on a plate of freshly made alimentary paste and bonded thereto in order to close one of their surfaces.

One can also obtain such alimentary paste food products by molding with a mold of an appropriate shape.

In another version of the alimentary paste food product according to the invention, and whatever may be the process used for its obtention, lengths of alimentary paste products can be connected by ribs of alimentary paste connecting the surfaces of adjoining lengths. Thus, the size of the voids between the parallel lengths of alimentary paste of the food product is increased, which is favourable for a fast cooking, in particular when the length of the alimentary paste products have a polygonal cross-section.

I claim:

1. An alimentary paste food product comprising an arrangement of parallel hollow elongate lengths of tubes of alimentary paste having a substantially circular cross-section, said tubes being connected to one another by outgrowing flanges of alimentary paste to form a substantially hexagonal structure, the arrangement having a substantially planar upper and lower surface, the lower surface being closed by a plate of alimentary paste of the same form as the arrangement, the tubes being intended to be filled with a sauce.

2. An alimentary paste food product according to claim 1, wherein the arrangement has a geometrical shape selected from the group consisting of square, rectangular, triangular, polygonal and circular.

3. An alimentary paste food product according to claim 2, wherein the arrangement is of a hexagonal shape and includes at least 17 tubes of alimentary paste products.

4. An alimentary paste food product according to claim 1, wherein the tubes of alimentary paste products are small macaronis having a circular cross-section and a length ranging from 1 to 4 cm.

5. An alimentary paste food product according to claim 1, wherein the arrangement of the tubes of alimentary paste products is at least partly surrounded by a plastic wrapping which can withstand cooking in water and which has openings.

6. A method of manufacture of an alimentary paste food product which comprises:

placing a selected number of tubes of alimentary paste products parallel to one another in a selected configuration, wetting at least ends of the tubes forming a first surface of the arrangement, and exerting a light pressure which tends to press the tubes against one another, for their assembling.

7. A method of manufacture according to claim 6, further including applying the first surface of the arrangement on a plate of alimentary paste which is slightly wetted, pressing the arrangement on said plate, the plate being cut so as to have the same shape and the same dimension as the arrangement, and thereafter drying the assembly.

8. A method of manufacture according to claim 6, further including placing the arrangement of tubes of alimentary paste products having the selected configuration dry inside a plastic wrapping.

9. A method of manufacture according to claim 6, further comprising cooking the arrangement in a boiling cooking liquid, removing the arrangement from the cooking liquid, draining and laying it flat, and introducing sauce at least in some of the tubes of alimentary paste.

10. A method of manufacture according to claim 8, further comprising cooking the arrangement in a boiling cooking liquid, removing the arrangement from the cooking liquid, draining and laying it flat, and introducing sauce at least in some of the tubes of alimentary paste.

\* \* \* \* \*